United States Patent Office 3,436,031
Patented Apr. 1, 1969

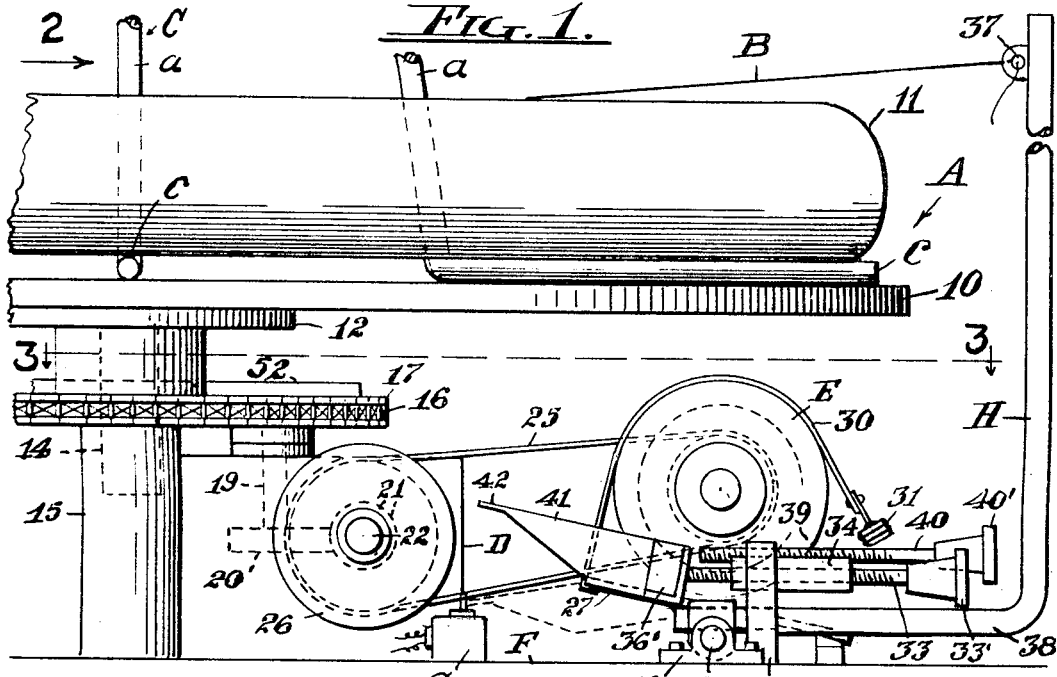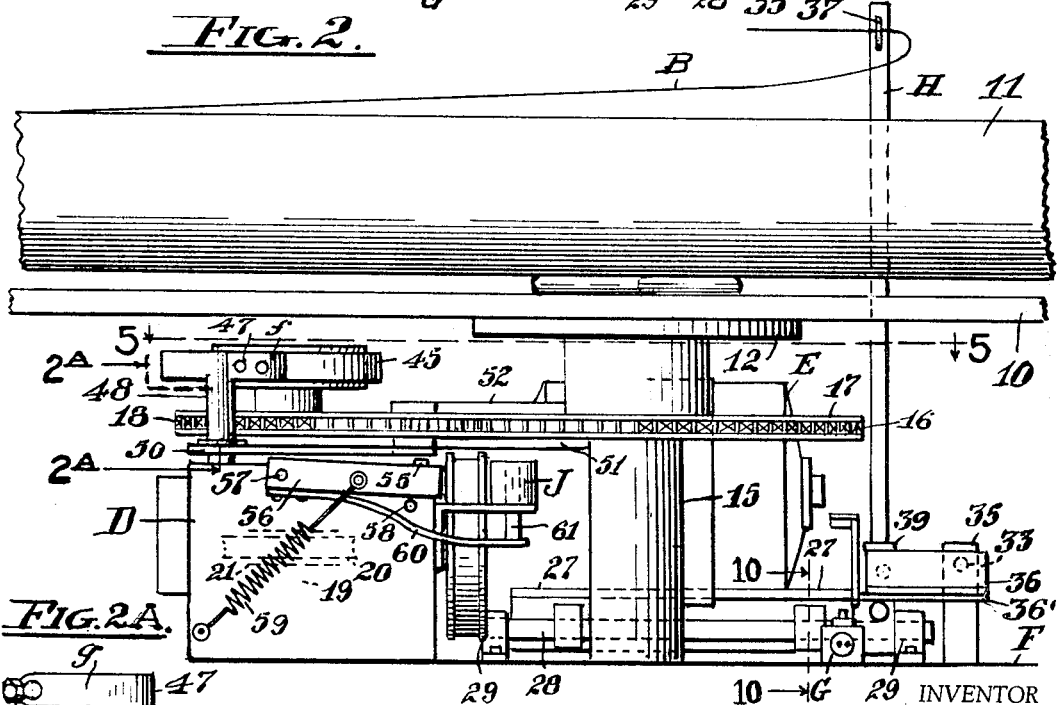

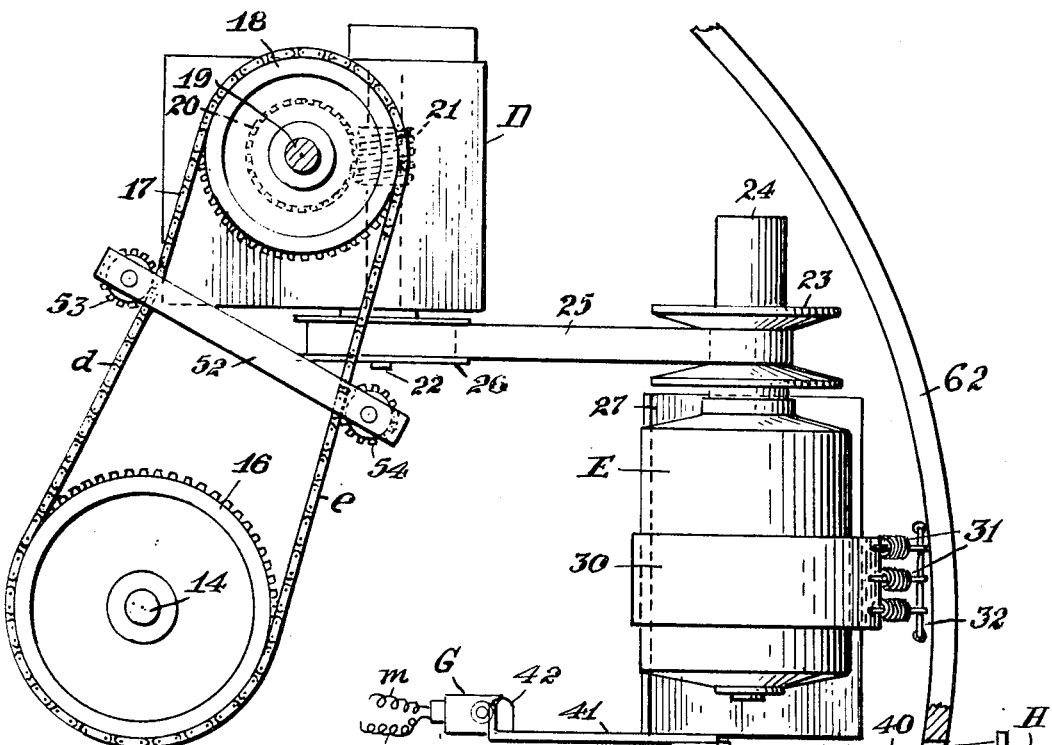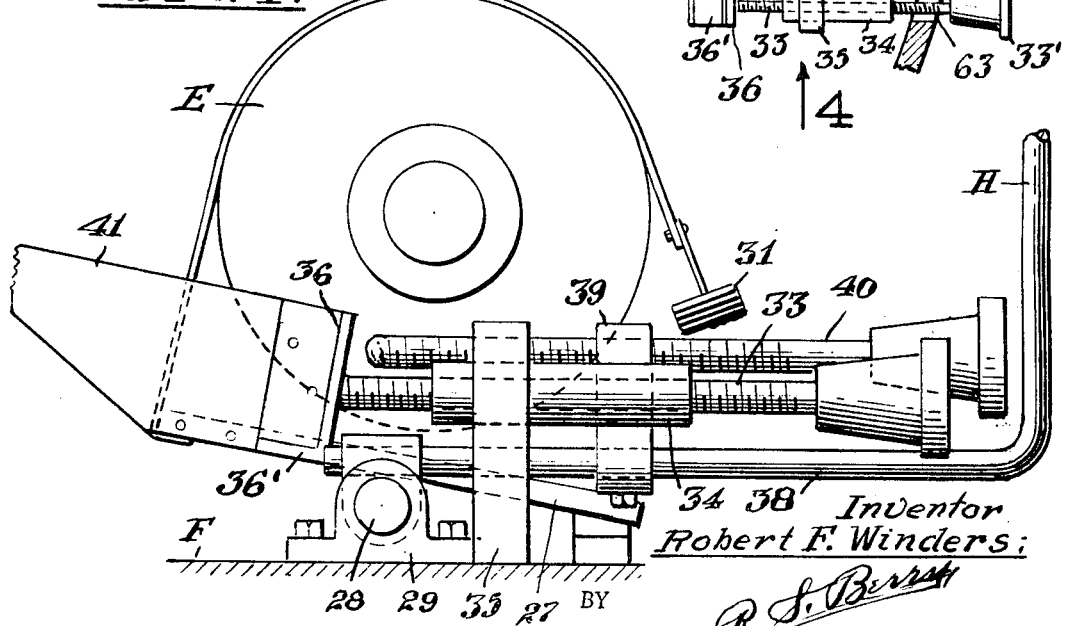

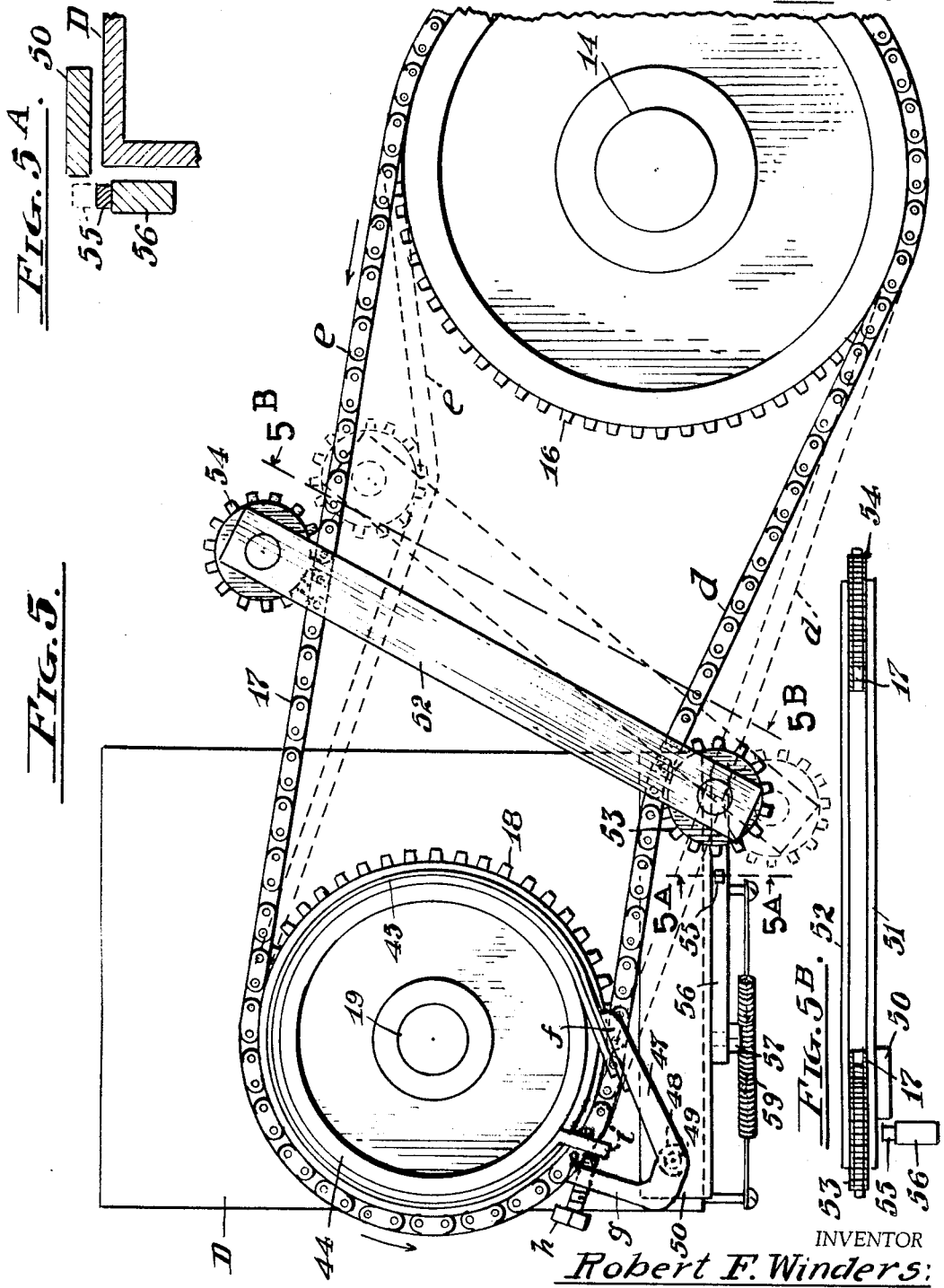

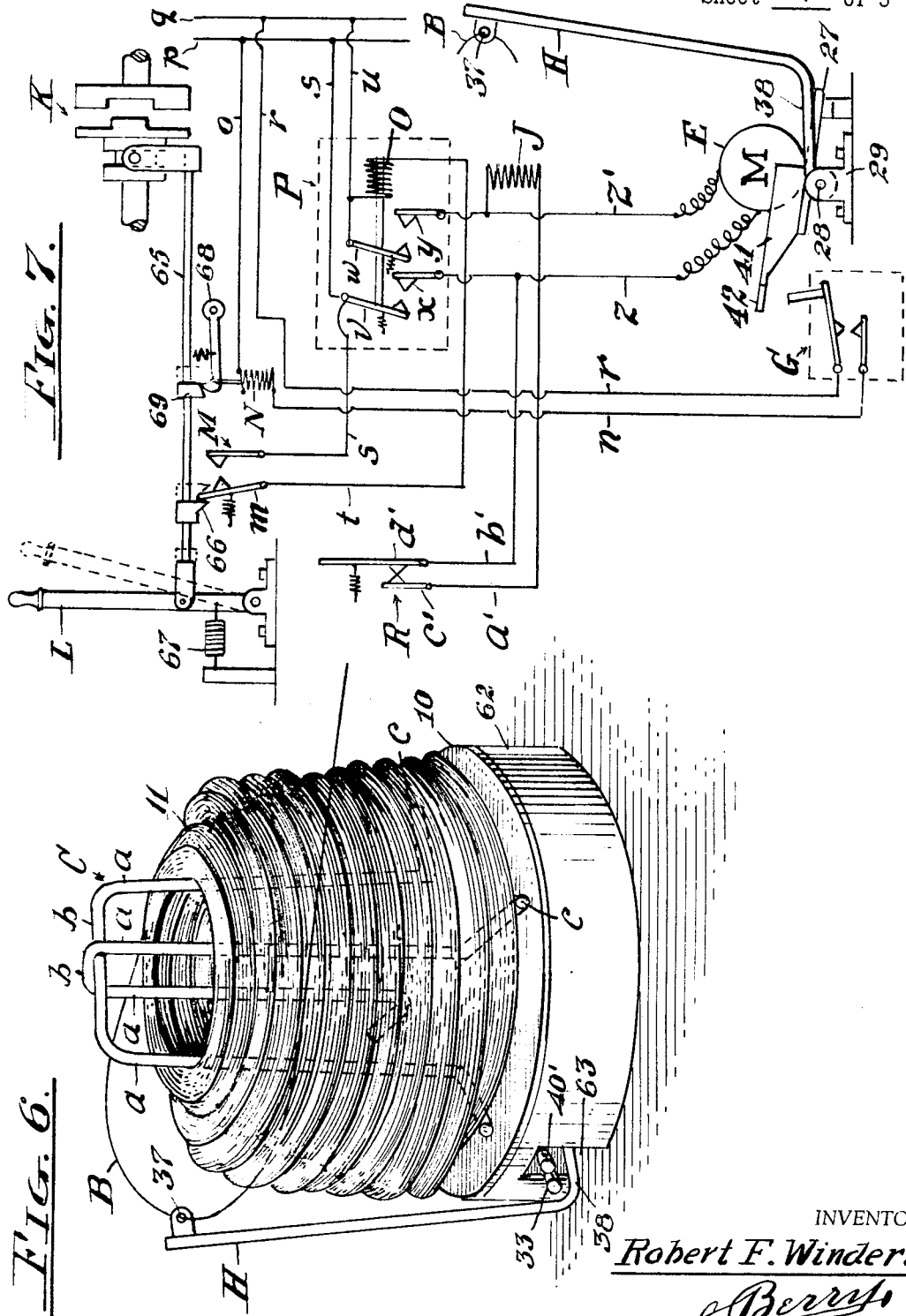

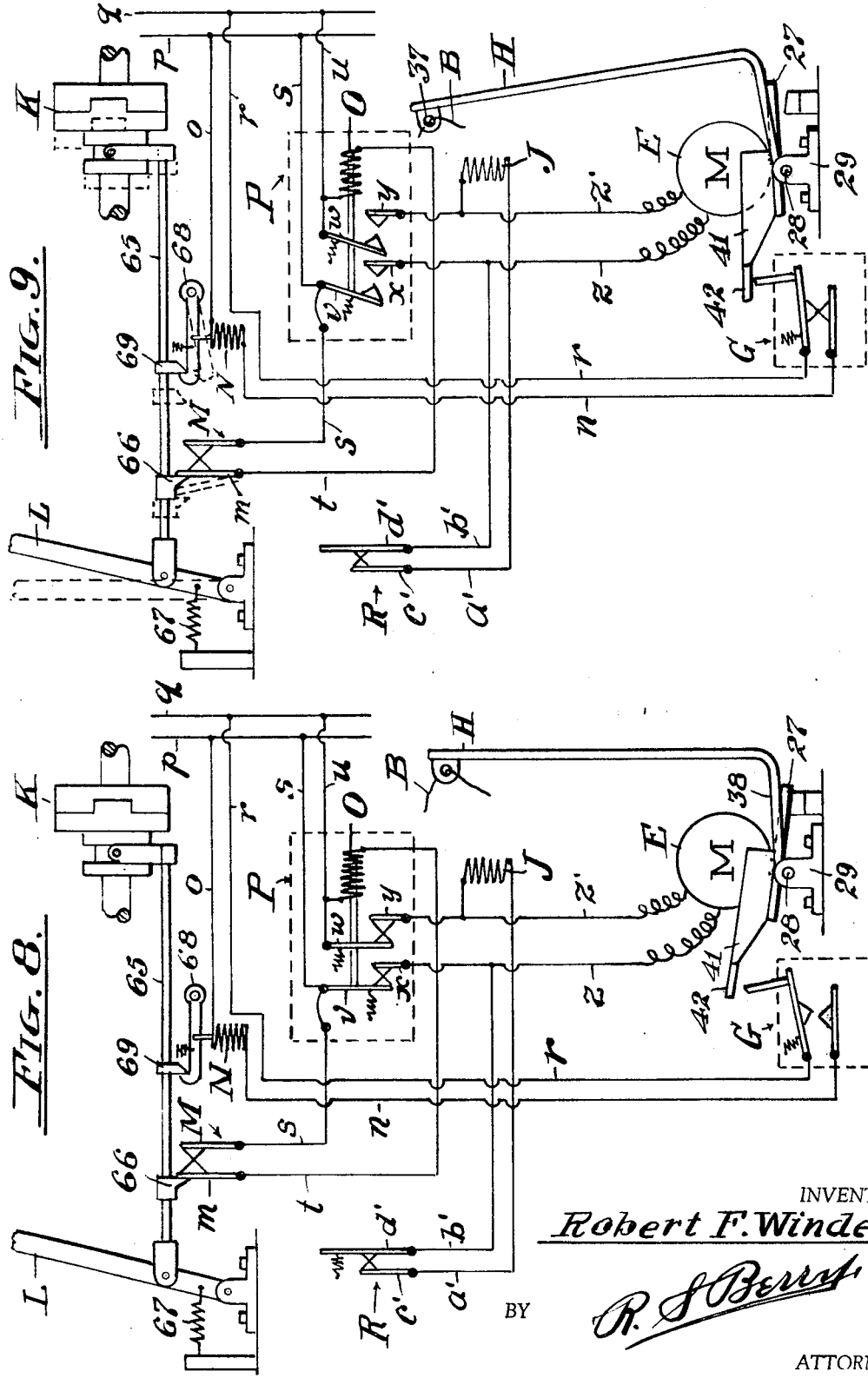

3,436,031
MECHANISM FOR DELIVERING WIRE FROM COILS THEREOF
Robert F. Winders, 4300 District Blvd., Los Angeles, Calif. 90058
Filed Dec. 19, 1966, Ser. No. 602,827
Int. Cl. B65h 25/00
U.S. Cl. 242—54      16 Claims

ABSTRACT OF THE DISCLOSURE

The invention herein set forth comprises a power propelled mechanism for delivering lengths of wire from coils or rolls thereof to machines for fabricating wire structures such as bed-springs, poultry wire, screens and the like and for subjecting wire to various processes such as coating, annealing and heat treatment; the actuating and control mechanism for wire delivering reels herein shown being specially designed to deliver wire from coils two feet or more in diameter and having a weight of five hundred pounds or more; the wire being delivered under controlled tension and regulated speed to a wire working machine having mechanism at its intake which exerts a pull on the wire being delivered thereto. The reel is motor propelled and its operating mechanism embodies an automatic braking system, constituting the essence of the present invention, whereby stoppage of a rapidly revolving heavily loaded reel may be quickly effected within a partial revolution thereof under the urge of force developed by momentum of the revolving reel; such braking action occurring automatically by mechanism actuated by obstructions such as kinks or entanglements developed in the length of wire being advanced by the reel and leading between the reel and the intake of the wire fabricating machine upon the advancing obstructions coming into positive engagement with and actuating an element controlling the braking system so as to effect application of a brake and co-incidently terminating powered propulsion of the wire delivering reel through mechanism actuated by the element controlling the braking system, so as to stop wire delivering rotation of the reel, and thereby preventing the obstruction in the wire from being fed into the wire working machine.

BACKGROUND OF THE INVENTION

Field of the art

The field of the art to which the invention pertains is embodied in U.S. classification 242, sub-classes 45, 75.5, 78 and 128, examples of which are Patent No. 2,341,474, issued Feb. 8, 1944, to Carroll E. Orr, Patent No. 2,664,250, issued Dec. 29, 1953, to John H. Friedman, and Patent No. 3,137,452, issued to the applicant herein under date of June 16, 1964.

Each of the aforesaid patents is predicated on a wire dispensing machine of the character of the machine herein set forth, in that the machines of said patents are intended to dispense wire from coils thereof and are equipped with means actuated by the wire being dispensed controlling the speed of the wire dispensing mechanism, and Patents 2,341,474 and 3,137,452 embodying brakes for automatically stopping the wire delivery controlled by obstructions in the wire.

The present invention is directed to improvements in the braking and speed control features above mentioned as well as to the structure of the wire dispensing machine as a whole.

DESCRIPTION OF THE ABOVE EXAMPLES OF THE PRIOR ART

The patent to Orr is predicated on a reel feed control embodying mechanism for automatically "disconnecting the reel from its power drive and braking it quickly to a stop when the wire going to the wire drawing machine from its supply source becomes tangled and locked," and shows a brake and clutch connection controlled by the movement of a tension arm, with means for disengaging the clutch and then applying the brake controlled by the pull of the wire on the arm embodying a switch closed by the arm when in an extreme position to energize a solenoid 83 which acts to open switch 83' to cut off the power source and to close another switch 83" to energize a solenoid which acts to disengage the clutch and apply the brake.

The mode of control by movement of a tension arm, shown by Orr, is characterized by first shutting off the power source and then releasing a clutch and applying a brake to stop rotation of the reel.

The patent to Friedman shows a rotary coil supporting table 7, powered mechanism 17 connected to the table for rotation thereof, a pivoted wire supporting arm 15, a variable speed transmission 18, and connections 23, 28 between the transmission and the arm to vary the speed of rotation of the table from a minimum to a maximum. While the patent refers to the machine as adapted to use wire or stock coils weighing several tons and mentions the inerta of such heavy stock that has to be overcome in starting the machine from a rest position no consideration is given to the momentum of the rapidly revolving reel that has to be overcome in arresting the reel and no braking system is shown.

Patent No. 3,137,452, issued to me June 16, 1964 is predicated on a mechanism for delivering wire from coils thereof adapted to deliver wire from coils weighing in the neighborhood of two thousand pounds. The mechanism embodies generally a rotary coil carrying table, powered mechanism connected to said table for rotating same to unwind wire from the coil thereon embodying a variable speed transmission, a pivoted arm engaged by the wire delivered from the coil, connections between said arm and transmission to vary the speed of rotation of the table according to various positions of said arm, and means for stopping rotation of said table controlled by movement of said arm to an advanced position, said means embodying a noramlly engaged clutch, and a brake controlling rotation of the table, together with means controlled by said arm for simultaneously disengageing said clutch and applying said brake.

The production of a wire feeding mechanism of a relatively large caliber presents a problem in that in order to be practical, the delivery of wire from a revolving reel must be effected under controlled high speed subject to the rapidly revolving reel being automatically brought to a quick stop in an emergency in order to avoid excessive unwinding of the coiled wire. This calls for the provision of a reel braking system wherein application of the brake and stoppage of the rapidly rotating heavily loaded reel is automatically effected by power actuated mechanism controlled by a kink or entanglement in the length of wire being delivered from the coil to the wire working machine.

Applicant's invention herein set forth solves the above recited problem in a more efficient and dependable fashion than heretofore and makes possible reliable automatic control and braking of a wire feeding mechanism capable of delivering wire from coils of wire weighing in excess of five hundred pounds.

SUMMARY

The invention pertains to a mechanism for delivering wire from coils thereof to a wire-working machine, wherein the mechanism embodies a power driven turntable carrying coiled wire which is unwound and delivered to the wire working machine by rotation of the turntable; the invention primarily residing in mechanism for automatically stopping rotation of the turntable embodying a brake and brake actuating mechanism powered by momentum of the rotating turntable or reel together with means whereby the operation of the brake actuating mechanism may be effected either automatically by engagement therewith of an obstruction on the wire being delivered from the rotating coil or effected manually, and wherein said means is utilized during operation of the wire delivering mechanism to actuate mechanism controlling the speed of rotation of the turntable to vary the delivery of the wire according to fluctuation in the consumption of the wire by the wire working machine.

The gist of the invention or the inventive concept generally consists in driving the rotary turntable through a conventional sprocket chain drive comprising a driven sprocket wheel attached to the turntable, an endless sprocket chain encompassing said wheel, and a driving sprocket wheel engaged by said chain fitted with a brake drum, and motor propelling said driving sprocket wheel through a variable speed belt and pulley arrangement; the invention further residing in the provision of means for applying a brake element to said drum to stop rotation of said sprocket chain drive and the turntable actuated by momentum of the turntable, together with means for coincidently terminating the application of driving power to said sprocket chain drive; and effecting said braking action and termination of driving power through mechanism actuated by an obstruction on the wire being delivered from a coil thereof carried on the turntable as above set forth.

The primary object of the invention is to produce a highly efficient and dependable mechanism for delivering wire from coils thereof which is capable of practically feeding wire from coils containing a much greater quantity of wire both as to weight and length than has heretofore been generally practiced so as to increase production and quality of manufactured wire products and effect a considerable saving in time and costs in the production and handling of coiled wire employed in the fabrication of wire products; and which mechanism embodies a highly effective braking system powered by momentum of the revolving reel whereby rotation of the reel may be quickly arrested within a partial revolution thereof.

Another object is to provide a braking system wherein the power employed in application of the brake is inherent in the machine whereby the employment of extraneous power such as electric energy, compressed air and hydraulic fluid is dispensed with; and also to provide a construction whereby a clutch and clutch operating mechanism is eliminated.

The invention is illustrated in the accompanying drawings in which:

FIG. 1 is a partial end elevational view of the wire delivering mechanism; portions being broken away;

FIG. 2 is a view in side elevation of the structure shown in FIG. 1 with parts removed;

FIG. 2A is a view in vertical section taken on the line 2A—2A of FIG. 2;

FIG. 3 is a section and plan view taken on the line 3—3 of FIG. 1 with portions broken away;

FIG. 4 is an enlarged detail in elevation as seen in the direction of the arrow 4 in FIG. 3;

FIG. 5 is an enlarged plan view with parts broken away, as seen on the line 5—5 of FIG. 2, showing the automatic braking mechanism;

FIG. 5A is a detail in section taken on the line 5A—5A of FIG. 5;

FIG. 5B is a view in section and elevation as seen on the line 5B—5B of FIG. 5;

FIG. 6 is a perspective view of the wire delivering reel;

FIG. 7 is a diagram depicting diagrammatically the electromechanical instrumentalities employed in controlling the wire delivering mechanism when associated with a wire-working machine, showing the parts as positioned preliminary to being placed in operation;

FIG. 8 is a diagram similar to that of FIG. 7, showing the parts as disposed in setting the wire-working machine and the wire delivering mechanism in operation;

FIG. 9 is a diagram similar to the diagrams of FIGS. 7 and 8 showing the parts as disposed on automatic coincident termination of operation of the wire-working machine and the wire delivering mechanism, and FIG. 10, sheet 1, is a detail in vertical section taken on the line 10—10 of FIG. 2.

Referring to the drawings more specifically A indicates generally a wire delivering reel which embodies a horizontally extending circular turntable 10 for supporting on its upper face a single coil 11 of wire, or a connected stack of coils, from which a single continuous length of wire B is to be delivered. The turntable is dimensioned to support coils 11 having an external diameter in excess of two feet and designed to support a weight of five hundred pounds or more and is constructed to receive and support a removable upstanding axial mandrel C constituting the core of the reel and which is snugly encompassed by the wire coil 11 to be carried on the turntable.

The mandrel C is here shown as comprising a series of four equally spaced apart substantially parallel vertically extending rods $a$ having their upper ends $b$ inturned and connected together and having their lower ends $c$ turned outward to form a base adapted to demountably seat on the upper face of the turntable 10 and to be held thereon against accidental displacement in any suitable manner; the members $c$ also serving as a support for the wire coils 11 around the core formed by the rods $a$. The coils thus mounted may be readily moved and be positioned on the turntable 10 by means of a hoist engaged with the joined upper ends $b$ of the rods $a$.

The turntable 10 is attached to a flange 12 on the upper end of an upright shaft 14 supported in a tubular standard 15 in a usual manner.

Fixedly mounted on the shaft 14 adjacent the bearing 15 is a driven sprocket wheel 16 with which is engaged an endless sprocket chain 17 leading horizontally around a companion driving sprocket wheel 18 of reduced diameter relative to the sprocket wheel 16. The sprocket wheel 18 is fixed on the upper end portion of a drive shaft 19 revolubly mounted in and projecting upwardly from a gear box D. The shaft 19 is fitted within the box D with a worm gear 20 intermeshed with a worm 21 on a horizontally extending shaft 22 which is journalled in and projects from the gear box and is driven by an electric motor E through a belt and pulley arrangement comprising a variable speed pulley 23 on the motor drive shaft 24, and a belt 25 leading from the pulley 23 to a pulley 26 on the shaft 22.

The motor E is tiltable transversely, that is in the direction of the length of the belt 25, whereby the speed of rotation of the worm shaft 22 and the mechanism propelled thereby may be varied. For this purpose, the motor is fixedly mounted on a base panel 27 fixedly carried on a rock-shaft 28 journalled at its ends in bearings 29. A band 30 overlies the motor E and is attached at one end to an edge of the panel 27. The opposite end of the band 30 is connected to the upper ends of a plurality of helical pull springs 31 the lower ends of which are connected to a fixture 32 affixed to the floor or base F on which the bearings 29, gear box D, and bearing 15 are mounted. The springs 31 are tensioned to exert a pull on the motor to bodily swing it outwardly on its pivotal mounting, that is in a direction to normally dispose the motor in a limited outwardly tilted position in which the variable speed pulley 23 will be disposed in its low speed position, as shown in FIG. 3.

A manually adjustable horizontally extending longitudinally moveable threaded stem 33 is screwed through an internally threaded sleeve 34 fixed relative to the floor F as on a standard 35 mounted on the floor; the stem 33 being presented at its outer end to an upstanding web 36 on a bracket 36' fixed relative to the motor E as on its base panel 27 which stem 33 serves as a stop against the inner end of which the web 36 abuts to limit the position at which the motor E will be brought to rest under the urge of the springs 31. By adjusting the stem 33 lengthwise arresting of the rearward pivotal movement of the motor may be varied.

An elongate upwardly extending control level H has a horizontally extending lower end portion 38 the outer end of which is pivoted on the rock-shaft 28. An eyelet 37 is provided on the upper portion of the lever H through which is rove a free coil coil B of the wire leading from the reel A, the eyelet being of such diameter that an entanglement or sharp bend in the wire will not pass therethrough but will abut the face of the eyelet on the side of the lever H entered by the coil B. When this occurs, continued advance of the wire will carry the lever H forward therewith under the fixed engagement between the lever and the obstruction on the wire afforded by the kink or entanglement.

The lower horizontal portion 38 of the lever H leading to its pivotal mounting has a standard 39 projecting upwardly therefrom having screwed through the upper portion thereof a manually adjustable threaded stem 40 which projects substantially parallel with the lower arm portion 38 in spaced relation thereto with its forward free end presented to the web 36 of the bracket 36' in suitably adjusted spaced relation thereto on the side thereof presented to the stem 40 whereby on forward swinging movement of the lever arm H the stem 40 will engage the bracket and effect advance swinging movement of the motor E in opposition to the pull springs 31.

Mounted to move with the panel 27 and here shown as fixed thereon adjacent the bracket 36 and extending horizontally therefrom opposite the stems 33 and 40 is a projection 41 having a spring tongue 42 on its outer end arranged, when the motor E is in its normal upright position, to be disposed in upwardly spaced relation to a normally open switch G on an arc such that when the motor is swung downward under the thrust of the lever H the spring tongue 42 will abut the switch G and effect closing thereof so as to actuate mechanism which will terminate operation of the motor E together with the mechanism operated thereby as will presently be described.

Means are provided for rapidly terminating rotation of the reel A which when in operation is revolving at high speed under considerable momentum, the latter being due to the weight and peripherial dimension of the coils 11 on the reel. This rotation of the reel would normally tend to continue after stopping of the motor and its driving action. However, since the shaft 19 and driving sprocket 18 is driven through the worm gear 20 and worm 21, continued rotation of the shaft 19 under the momentum of the reel A is prevented since the worm 21 obstructs rotation of the gear 20 and shaft 19.

In order to obviate impact of the teeth of the worm gear 20 on the worm 21 in event of the drive shaft 19 being subjected to the driving action of the reel momentum, braking means are provided for preventing rotation of the shaft 19 under such action and at the same time arresting rotation of the reel when emergency arises. The braking mechanism here shown as employed for this purpose utilizes the power of the recited momentum in so doing. Such means embodies a brake-drum 44 fixedly mounted on the shaft 19 immediately above the gear box D, around which is passed a band brake 45 one end of which is connected to one arm f of a cross-head 47 on the upper end of a post 48 fixedly attached to and projecting upwardly from the pivotal point 49 of a horizontally extending elongate arm 50 carried on the top of the box D and leading thereover in spaced relation thereto toward the sprocket wheel 16. The other end of the band-brake 45 is adjustably connected to the other arm g of the cross-head 47, which arm g is fixed on the post 48 whereby on turning of the post 48 affected by swinging movement of the arm 50, the band-brake may be disposed in and out of braking engagement with the brake-drum 44. The connection between the band-brake 45 and the cross-head arm g comprises an adjustable headed screw h threaded through the arm g and having its inner end abutting an outwardly extending shoulder i on the adjacent end of the band 45.

The pivotal mounting 49 of the arm 50 comprises a cylindrical stem j projecting from the lower end of the post axially thereof and extending through the top wall k of the box D, as shown in FIG. 2A.

The arm 50 terminates at a point slightly less than midway between the sprocket wheels 16 and 18 in spaced underlying relation to the trailing run d of the sprocket chain 17. Leading diagonally from the outer end of the arm 50 in fixed superimposed relation thereto is an elongate bar 51, the end portions of which underlie the runs d–e of the sprocket chain 17. A complementary bar 52 overlies the bar 51 and the runs d–e of the sprocket chain, and revolubly mounted between the protruding end portions of the pair of bars 51–52 is a pair of toothed wheels 53–54 the teeth of which idly mesh with the outer sides of the runs d—e substantially intermediate the lengths of the runs extending between the sprocket wheels 16–18.

In order to harness the force developed by momentum of the revolving loaded reel A for braking purposes, the sprocket chain 17 is made of such length as to produce a slack in the trailing run d, and the toothed wheels 53–54, are spaced apart on the bar 50 such distance that when engaged with the runs d–e the trailing run d will be drawn inward so as to converge toward the leading run e and the slack in the run d thus taken up in the form of a wide V as shown in FIG. 5.

Since the pair of bars 51–52 is subject to a longitudinal pull when the bars are in their advanced position shown in FIG. 5, toward their retracted position indicated in dotted lines in FIG. 5, under the influence of the run d of the chain 17 when traveling over the roller 53, thus tending to swing the arm 50 outward, a retractable stop 55 is provided, which stop normally extends in front of and adjacent the outer margin of the outer end portion of the arm 50, as indicated in doted lines in FIG. 5A, when the machine is in operation, to then prevent outward swinging movement of the arm and conseqeunt movement of the bars 51–52, but which stop is automatically withdrawn coincident with closing of the switch G and stopping of the motor E.

To accomplish this action the stop 55 is mounted on the upper edge of a vertically swinging bar 56 pivoted at 57 on a side wall of the gear box D, and so arranged that on upward movement of the bar 56 the stop 55 will protrude alongside the outer margin of the arm 50. However the bar 56 is normally maintained in its lowered position against an abutment 58 with the stop 55 clear of the arm 50 by a pull spring 59. As a means for actuating the bar 56 to dispose the stop 55 in its upper operative position, a downwardly inclined plate spring 60 has its upper end affixed to the underside of the bar 56 and has its lower end attached to the lower end of an upstanding core 61 of a solenoid J whereby on and during energization of the solenoid the bar 56 will be disposed and held in its elevated position with the stop 55 alongside the arm 50 thereby preventing outward swinging movement of this arm while the solenoid is energized which is while the machine is in operation.

The above recited mechanism for actuating and controlling the turntable 10, other than the up-standing lever H and hand holds 33' and 40' on the outer ends of the threaded stems 33–40, is enclosed in a cylindrical housing 62 which seats on the floor F and extends between the floor and the underside of the turntable and conforms to the margin of the latter, as shown in FIG. 6. The housing 62 has an opening 63 through which the horizontal portion 38 of the lever-arm H, and the hand-holds 33' and 40' extend to the exterior of the housing, as shown in FIGS. 3 and 6.

Referring now to FIG. 7 depicting diagrammatically the electromechanical instrumentalities employed when associating the above described wire delivering mechanism with a wire-working machine, where it is necessary to regulate and control the delivery of wire from the reel A in accordance with the requirements or consumption demands of the wire working machine, and whereby the wire delivering mechanism will function only when the wire working machine is in operation and whereby the wire working machine will operate only when wire is being supplied by the delivery mechanism.

In FIG. 7, K indicates a conventional clutch in a wire working machine shown in its disengaged position, and L denotes a hand lever whereby the clutch may be manually engaged or disengaged to place the wire working machine in or out of operation, through a longitudinally moveable connecting rod 65 leading from the lever L to the clutch K in the usual manner. Positioned adjacent the rod 65 is a normally open switch M and fixedly mounted on the rod 65 is a projection 66 arranged to engage the actuating element m of the switch M on advance of the lever L, rod 65 and finger 66, in engaging the clutch K to thereby close the switch M co-incident with engagement of the clutch as shown in FIG. 8.

Releasable means are provided for holding the shaft 65 in its advanced clutch engaged position in opposition to a pull spring 67 connected to the lever L and acting to normally dipose the lever L and shaft 65 in their retracted clutch disengaging position. This means comprises a spring pressed latch 68 engageable with a flange 69 on the shaft 65 when the latter is in its advanced position, which latch is adapted to be operated to disengage the flange 69 by energizing a solenoid N connected to the latch which is effected by closing the switch G, as will presently be described.

Leading from the terminals of the solenoid N is a pair of conductors n and o of which the conductor n leads to one terminal of the switch G while the conductor o leads to a conductor p constituting one of a pair of main line conductors p–q leading from a source of electric current supply. A conductor r leads from the other terminal of the switch G to the other main line conductor q.

Leading from the terminals of the lever actuated switch M is a pair of conductors s–t of which the conductor s connects with the main line conductor p and the conductor t leads to one terminal of a solenoid O in a conventional solenoid switch P the other terminal of which solenoid O connects with a conductor u leading to the main line conductor q. The switch P embodies a pair of normally open switch elements v–w controlled by the solenoid O, which elements are respectively connected to the main line conductors p–q through the conductors s–u and are adapted on energization of the solenoid O to be closed to contacts x–y from which lead a pair of conductors z–z' connecting with the terminals of the motor E whereby the motor is set in operation on closing the switch elements v–w to the contacts x–y.

A shunt circuit leads through the solenoid J comprising a pair of conductors a'–b' of which the conductor a' leads from one terminal of the solenoid J to one element c' of a normally closed manually operable switch R the other element d' of which switch connects with the conductor b' which leads to the conductor z. The other terminal of the solenoid J connects with the conductor z'. This shunt circuit serves to maintain the solenoid J energized throughout operation of the motor E and affords means whereby the solenoid J may be de-energized while the machine is in operation by opening the switch R, in event it is desired to withdraw the stop 55 from engagement with the brake operating arm 50 to release the latter.

In the operation of the invention, upon the turntable being loaded with a mandrel C bearing a supply of wire rolls or coils 11 as shown in FIG. 6, the leading end convolutions of the wire are unwound from the reel to form the coil B in space. The terminal portion of the wire is rove through the eyelet 37 on the outer end of the lever H and then delivered into a wire working or treating machine, not shown.

This loading operation is effected while the machine and the wire working mechanism are out of operation and the parts are disposed as shown in FIG. 7; that is with the clutch K controlling operation of the wire working mechanism open, the control lever L retracted under the urge of the spring 67, and the switches G, M, and P open so that the motor E and each of the solenoids J, N and O are de-energized.

Operation of the wire working mechanism and the wire dispensing machine is initiated by advancing the hand lever L as indicated in dotted lines in FIG. 7 and shown in full lines in FIG. 8. This operation of the lever L advances the rod 65 so as to engage the clutch K and thereby set the wire working mechanism in operation in the usual manner, and coincidently closes the switch M through the projection 66 on the rod 65 and advances the flange 69 on the rod 65 into locking engagement with the spring pressed latch 68, which acts to hold the rod in its advanced clutch engaging position. Closing of the switch M directs electric current through the solenoid O of the switch P thereby energizing the solenoid which will then act to close the switch elements v–w to the contacts x–y thereby directing current through the motor E thus energizing the motor E and setting it in operation to thereby drive pulley 23 on the motor drive shaft, belt 25 engaged by pulley 23, pulley 26 engaged by belt 25, shaft 22 on which pulley 26 is mounted, so as to drive sprocket wheel 18 through worm gears 21–20 and shaft 19. Rotation of the sprocket wheel 18 drives sprocket chain 17 and sprocket wheel 16 to thereby rotate the reel A and unwind wire from the coils 11 thereon and deliver it to the wire working mechanism through the coil B.

In the operation of wire working machines as is well-known, the length of wire being delivered to the machine is fed into the latter by mechanism which imposes a pull on the wire which is usually variable and intermittent according to requirements; the feed of the wire, being stopped during a severing operation and being accelerated and retarded from time to time during fabrication of the wire.

The lever H engages the coil B at a point where the coil will exert a pull on the lever tending to swing it forward in opposition to the weight thereof to a position wherein the inner end of the abutment stem 40 will be spaced from the bracket 36 on the base of the tiltable motor E as shown in FIG. 4, which spacing forms a clearance affording lost motion of the lever H permitting minor movement thereof without materially tilting the motor E. The purpose of the lever H is like that of a similar element in Patent 3,137,452 aforesaid, namely to maintain the wire taut and to rock the pivoted motor E in event of entanglement or kinking of the wire being delivered from the reel, which occurs when the lever is positively engaged by an obstruction on the advancing wire.

However, by reason of frictional engagement of the advancing wire with the lever H the latter will be variably oscillated according to fluctuations in the movement of the wire under the pull imposed thereon by the intake of the wire working machine so that while the stem 40 on the lever H is in abutting engagement with the bracket 36 the motor E will be moved back and forth according to variations in the speed of the advancing wire to thereby act through the changed speed drive afforded by the pulleys 23–26 and belt 25 to vary the speed of rotation of the wire delivering reel A and varying the speed of the advancing wire accordingly.

As here shown, the reel A is rotated counterclockwise. The springs 31 retain the motor E in a normally retracted tilted position on its pivotal mounting, with the threaded stem 33 limiting such position and adjusted as occasion may require to determine the minimum speed of rotation of the reel A through variable speed pulley 23 and controls the minimum rate of unwinding of the wire from the coils which manifestly may be varied within limits by adjusting the tilt of the motor E through the control afforded by the threaded stem 33.

During the above recited driving of the reel A the chain 17 is driven from the sprocket wheel 18 under the action of the motor E whereby the leading run e of the chain will be drawn taut thereby exerting a pull on the bar 51–52 and arm 50 so as to swing the arm in a direction to free the brake elements 44–45.

Downward movement of the lever H to its lowermost position, whether effected manually or by an obstruction on the advancing wire, will tilt the panel 27 so that the finger 42 on the bracket 41 thereon will engage and close the switch G as shown in FIG. 9 thereby directing current through the solenoid P to energize the latter and cause it to withdraw the latch 68 out of engagement with the flange 69 on the rod 65 whereupon the spring 67 will restore the hand lever L and rod 65 to normal as shown in FIG. 7 and indicated in dotted lines in FIG. 9, thereby disengaging the clutch K so as to stop operation of the wire working mechanism. Retraction of the rod 65 permits the switch M to open thereby de-energizing the solenoid O so that the switch elements v–w will open thereby breaking the circuit through the motor E so as to terminate motorized propulsion of the reel A and at the same time break the shunt circuit a'–b' and thereby de-energize solenoid J whereupon the bar 56 will be swung down by the spring 59 so as to withdraw the stop 55 from in front of the brake control arm 50 to permit advance of the latter.

However, the reel A, shaft 12 and sprocket wheel 16 will continue to rotate under momentum a minor portion of a revolution after the sprocket 18 comes to rest due to the slack in the trailing run d of the sprocket chain 17, such movement enduring for the very short duration required to take up the then slack in the run d and thereby aligning this run and transferring the slack into the run e, as indicated in dotted lines in FIG. 5. By so doing the bars 51–52 will be moved longitudinally by the pull imposed thereon by the outwardly moving run e of the chain 17 thrusting against the toothed wheel 54 on the bar thereby swinging the brake operating arm 50 outwardly to thereby apply the brake band 45 and lock the shaft 19 against revolving before any rotative effort can be applied thereto from the reel A and at the same time braking the sprocket wheel 18 such as to prevent advance of the sprocket chain 17 and thereby bring the sprocket wheel 18, shaft 12, and reel A to rest. This is accomplished within a small portion of a revolution of the reel.

After stopping the machine as above described, restarting the wire delivering operation and setting the wire working mechanism in operation is effected as before described, after removing the offending obstruction and manually restoring the lever arm H to its elevated position with the wire engaged in the eyelet 37, thereby lifting the projection 42 and relieving the switch G so that the switch will be restored to its normal open position. On starting the motor E and thereby placing the propulsive force on the sprocket wheel 18, the then slackened run d of the chain 17 will be pulled taut to thereby retract the bars 51–52 and brake operating arm 50 so as to release the brake members 44–45 and permit rotation of the sprocket wheel 18, shaft 19 and their associated parts. In the meantime the solenoid J became energized on closing the switches M and P and elevating the bar 56 through the plate spring 60 so as to move the stop 55 against the underside of the arm 50 and thereafter into its locking position alongside the outer margin of the arm.

When it is desired to stop the operation of the wire delivering mechanism and the wire working machine such is accomplished by manually releasing the latch 68 to permit retraction of the rod 65 thereby breaking the circuit through to motor E and stopping the wire working machine by disengaging the clutch K.

Since closing of the open switch G sets a train of actions in operation resulting in termination of motor propulsion of the reel A, and application of the brakes to stop rotation of the reel, together with stoppage of the operation of the wire working mechanism, it is manifest that while means are provided for automatically closing said switch, that, if occasion should require, such actions could be effected by manually closing the switch, either directly or by manually actuating the lever H to do so.

I claim:

1. In a machine for delivering wire from a coil thereof, the combination of a revoluble reel for supporting wire coils, powered means for rotating said reel to deliver wire from the coil thereon, means controlling said powered means, said reel being adapted to revolve under momentum on actuating said controlling means to terminate operation of said powered means, a brake for stopping rotation of said reel, and means actuated by momentum of said reel for applying said brake.

2. The combination called for in claim 1 in which said last named means embodies a longitudinally moveable brake operating bar, and means influenced by rotation of said reel under momentum for actuating said bar to apply said brake.

3. The combination called for in claim 1 in which said last named means embodies an endless sprocket chain and a pair of sprocket wheels with which said chain is engaged, a bar for actuating said brake connected to the runs of said chain, and means whereby a lateral pull imposed on said chain influenced by movement of said reel under momentum will actuate said bar to apply said brake.

4. The structure called for in claim 1 in which said reel rotating means includes a gear wheel, a worm engaging said gear wheel, a motor, and means for driving said worm from said motor.

5. The structure called for in claim 1 in which said reel rotating means includes a gear wheel, a worm engaging said gear wheel, a motor, means for driving said worm from said motor, and variable speed control mechanism embodied in said last named means.

6. The structure called for in claim 1 in which said reel rotating means includes a gear wheel, a worm engaging said gear wheel, a motor, means for driving said worm said motor, variable speed control mechanism embodied in said last named means, and means operated by movement of the wire delivered from the coil thereof for actuating said variable speed control mechanism.

7. The structure called for in claim 1 in which said reel rotating means includes a gear wheel, a worm engaging said gear wheel, a motor, means for driving said worm from said motor, variable speed control mechanism embodied in said last named means, means operated by movement of the wire delivered from the coil thereof for actuating said variable speed control mechanism, and means actuated by said last named means controlling the application of said brake.

8. The structure called for in claim 1 in which said momentum actuated means embodies a bar extending astride said sprocket chain, connected at its end portions to the runs of said chain intermediate said sprocket wheels, one of the runs of said sprocket chain slack and the other taut whereby on subjecting the slack run to a pull said bar will be advanced longitudinally, and means actuated by such movement of the bar for applying said brake.

9. In a machine for delivering wire from a coil thereof, the combination of a driving sprocket wheel, a driven sprocket wheel, an endless sprocket chain engaged by said sprocket wheels having a leading and a following run extending between said sprocket wheels, said leading run being taut and said trailing run being slack, a bar extending across said sprocket chain intermediate said sprocket wheels, toothed rollers on said bar meshing with the outer sides of said sprocket chain and with said following run converging toward said leading run; a shaft on which said driven sprocket wheel is mounted, a turntable on said shaft, bearing coiled wire to be delivered, powered means for propelling said turntable through said driving sprocket wheel, a brake for stopping rotation of said driving sprocket wheel, means whereby an obstruction on the wire being delivered will terminate said powered propulsion, whereby said turntable will be caused to turn momentarily under momentum and thereby draw the following run taut and transpose the slack into the leading run, and whereby said bar will be advanced longitudinally, and means actuated by the advance of said bar for applying said brake.

10. The combination called for in claim 9, together with a stop for holding said bar against longitudinal movement during operation of the machine, and means for retracting said stop coincident with termination of the powered propulsion to free said bar.

11. The combination called for in claim 9 in which said last named means comprises a brake operating arm attached to said bar, and wherein said brake comprises a band attached to said arm and embodies a drum attached to said driving sprocket wheel and encompassed by said band.

12. The structure called for in claim 9 wherein said powered means embodies an electric motor and means controlling same, and wherein said propulsion terminating means operates to actuate said motor control means to stop the motor.

13. In a machine for delivering wire from coils thereof, the combination of a reel carrying wire to be delivered, an electric motor, means controlling said motor, a sprocket chain actuated by said motor for driving said reel, means actuated by an obstruction on the wire being delivered for actuating said means to stop said motor, said reel being adapted to turn momentarily under momentum on stopping said motor, a brake for stopping said reel, and means whereby turning of said reel under momentum will operate through said sprocket chain to apply said brake.

14. In a machine for delivering wire from coils thereof, a pair of sprocket wheels including a driving sprocket wheel and a driven sprocket wheel, an endless sprocket chain engaged by said wheels embodying a pair of runs, a reel for carrying coiled wire to be delivered, a reel support attached to the driven sprocket wheel, means for propelling the driving sprocket wheel to drive said sprocket chain and the reel, a brake for stopping rotation of said reel, and means for applying said brake actuated by momentum developed by rotation of said reel.

15. In a machine for delivering wire from coils thereof, a reel for carrying a reel of wire to be delivered, a turntable on which said reel is mounted, an upright rotary shaft carrying said turntable on its upper end, a driven sprocket wheel on said shaft, a driving sprocket wheel, means for braking said driving sprocket wheel, an endless chain engaged by said sprocket wheels having a leading run and a trailing run leading between said sprocket wheels, said leading run being taught and said trailing run being slack, and a bar extending between said runs, toothed rollers on said bar meshed with the outer sides of said sprocket chain with said slack trailing run converging toward said leading run, whereby on drawing said trailing run taut and transfering the slack into the leading run, said bar will be pulled longitudinally, and means for actuating said braking means by longitudinal movement of said bar.

16. In a machine for delivering wire from coils thereof, the combination of a revoluble turntable for supporting a coil of wire, a driven sprocket wheel connected to said turntable, a driving sprocket wheel, an endless sprocket chain engaging said sprocket wheels having a taut run and a slack run leading between said wheels, a longitudinally moveable bar extending across said sprocket chain between said wheels, idler toothed wheels on the end portion of said bar engaged with said runs on the outer sides thereof, a brake actuating arm connected to one end of said bar leading laterally thereof; a brake attached to said driving sprocket wheel, brake operating connections between said arm and brake, powered means for driving said turntable through said sprocket wheels and chain including a change speed mechanism operatively connected to said driving sprocket wheel and an electric motor operatively connected to said change speed mechanism to drive said driving sprocket wheel through said change speed mechanism; a normally open switch (P) controlling said motor, a solenoid (O) controlling said switch, a normally open switch (M) controlling said solenoid, manually operable means for closing said switch (M) to thereby energize said solenoid so as to close said switch (P), and means operated by the wire being delivered for controlling said change speed mechanism, means actuated by said last named means operable to terminate operation of said powered means, and means actuated by said last named means for stopping rotation of said turntable by application of said brake through actuation of said bar and arm under the influence of momentum of said turntable.

References Cited

UNITED STATES PATENTS 2,528,410  10/1950  Banaszak _____ 242—156.2
3,282,518  11/1966  Holmes _____ 242—54

GEORGE F. MAUTZ, *Primary Examiner.*

U.S. Cl. X.R.

242—45, 75.44, 156.2